(12) United States Patent
Stålnacke et al.

(10) Patent No.: US 8,345,580 B2
(45) Date of Patent: Jan. 1, 2013

(54) METHOD AND ARRANGEMENT FOR VIRTUAL MEETING

(75) Inventors: Marika Stålnacke, Luleå (SE); Tommy Arngren, Södra Sunderbyn (SE); Olof Lundström, Stockholm (SE); Tor Minde, Gammelstad (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1074 days.

(21) Appl. No.: 12/299,673

(22) PCT Filed: May 5, 2006

(86) PCT No.: PCT/SE2006/050104
§ 371 (c)(1),
(2), (4) Date: Nov. 5, 2008

(87) PCT Pub. No.: WO2007/129942
PCT Pub. Date: Nov. 15, 2007

(65) Prior Publication Data
US 2009/0067350 A1 Mar. 12, 2009

(51) Int. Cl.
*H04L 12/16* (2006.01)
*H04M 3/56* (2006.01)
*H04N 7/15* (2006.01)

(52) U.S. Cl. ........................ 370/260; 370/270

(58) Field of Classification Search .................. None
See application file for complete search history.

(56) References Cited

U.S. PATENT DOCUMENTS

| 6,850,496 | B1 * | 2/2005 | Knappe et al. ................ 370/260 |
| 2005/0091379 | A1 * | 4/2005 | Kim et al. ..................... 709/227 |
| 2007/0121584 | A1 * | 5/2007 | Qiu et al. ...................... 370/352 |
| 2007/0189267 | A1 * | 8/2007 | Metcalf et al. ................ 370/352 |
| 2008/0039132 | A1 * | 2/2008 | Delibie et al. ............. 455/552.1 |
| 2008/0263212 | A1 * | 10/2008 | Goix et al. .................... 709/228 |
| 2010/0002690 | A1 * | 1/2010 | Schulzrinne et al. ......... 370/352 |

FOREIGN PATENT DOCUMENTS
JP 2007-096838 A 4/2007

* cited by examiner

*Primary Examiner* — Chi Pham
*Assistant Examiner* — Soon-Dong D Hyun

(57) ABSTRACT

The present relates to a method and arrangement for controlling streams of participants of a virtual meeting, wherein at least a first participant and a second participant are located in a first location and at least a third participant is located in a second location. The arrangement comprises means for receiving location information associated with identity information for each participant, means for receiving a stream from each participant whereby the stream comprises at least audio and an identity of the respective participant, means for controlling transmission of each received stream separately to said participants based on said location information and identity information such that streams between the participants in the same location are blocked.

26 Claims, 5 Drawing Sheets

METHOD AND ARRANGEMENT FOR VIRTUAL MEETING

FIELD OF THE INVENTION

The present invention relates to a method and arrangement for a virtual meeting, the present invention relates in particular to an improvement of the sound of a virtual meeting.

BACKGROUND

"Virtual meetings"—with participants in two or more different venues—are very common in today's business life, in particular since both small and large enterprises and other organizations nowadays have the whole globe as their working environment.

Communication and collaboration within a virtual meeting is enabled by network functions and ranges from simple voice telephony over video conferencing to more or less advanced document collaboration, one2one in-conference communication etc. Existing technologies/solutions include multi party calls, voice and VoIP conferencing, video conferencing and PC based collaboration tools.

A common set-up for a virtual meeting is: one conference room with several participants, one or two people attending remotely from their own office plus a few people on-the-move calling in. A speaker phone or PC-based voice connection allows communication between the conference room and the various remote venues.

The meeting can not start until all participants enter the conference room and join the conversation via the speaker phone. Furthermore, the meeting is dependent on voice communication from a number of sources like mouth-to-ear, fixed phones and mobile phones.

People sitting far away from a microphone often have problems being heard by remote participants. Even with separate microphone extensions, not everyone is close enough to a microphone. A person standing at a whiteboard for example, is often too far away. A simple turn of the head to look at a presentation or someone in the room makes the sound deteriorate.

Speaker loudness needs to be set to one level only, which might be too loud for someone sitting close, in order to be loud enough for someone sitting farther away. People with hearing difficulties have no means for individual adjustment.

Therefore, it would be desired to achieve a solution where each participant can have its own speaker and microphone even if they are sitting in the same room.

SUMMARY

Thus an object with the present invention is to improve the sound for participants of a virtual meeting.

The object is achieved by the arrangement and the method according to the independent claims. Embodiments of the invention are defined by the dependent claims.

The arrangement according to the present invention comprising means for receiving location information associated with identity information for each participant, means for receiving a stream from each participant whereby the stream comprises at least audio and an identity of the respective participant, means for controlling transmission of each received stream separately to said participants based on said location information and identity information such that streams between the participants in the same location are blocked, improves the sound for participants of a virtual meeting.

The method according to the present invention comprising the steps of receiving location information associated with identity information for each participant, receiving a stream from each participant whereby the stream comprises at least audio and an identity of the respective participant, and controlling transmission of each received stream separately to said participants based on said location information and identity information such that streams between the participants in the same location are blocked, improves the sound for participants of a virtual meeting.

According to embodiments of the invention the location information of each participant is received at a login procedure or periodically.

According to an embodiment, the location information is retrieved wherein the retrieving is triggered by a predetermined event.

Further, the identity information is a SIP address, IMSI or an IP address.

According to an embodiment, the means for controlling comprises further means for directing a first stream from one participant in the first location to a set of participants in another location wherein the first stream is blocked to participants not being in said first set.

According to an embodiment, the arrangement comprises means for logging the activity of the participants based on the identity information and means for presenting the logged activity to the participants of the virtual meeting.

According to one embodiment means for adding at least two streams into one stream is provided.

According to one embodiment, means for voice activity detection, VAD, and means for only sending streams wherein voice is detected are provided. In one alternative the decoding and coding are based on the VAD. In another alternative, output between coded incoming streams is switched based on the VAD and means for performing decoding only when voice is detected.

According to one embodiment, the arrangement of the invention constitutes a server and the method of the invention is implemented in a server and the participants constitutes clients in a client server solution.

According to another embodiment, the arrangement of the invention is implemented in a mobile phone of a participant of the virtual meeting and constituting a moderator peer and the mobile phones of the participants of the virtual meeting constituting peers in a peer-to-peer solution. Further, the method of the invention is according to this embodiment implemented in a mobile phone constituting the moderator peer.

An advantage with the present invention is that the users can attend virtual meetings with enhanced sound quality and presence overview (e.g. visualize who is speaking), both for participants on-the-move and those present in a conference room.

Further, the flexibility will increase, since the ability to effectively setup and manage the meeting by muting of participants, set-up whispering communication etc. will become easier.

DETAILED DESCRIPTION OF THE PRESENT INVENTION

Figure 1:
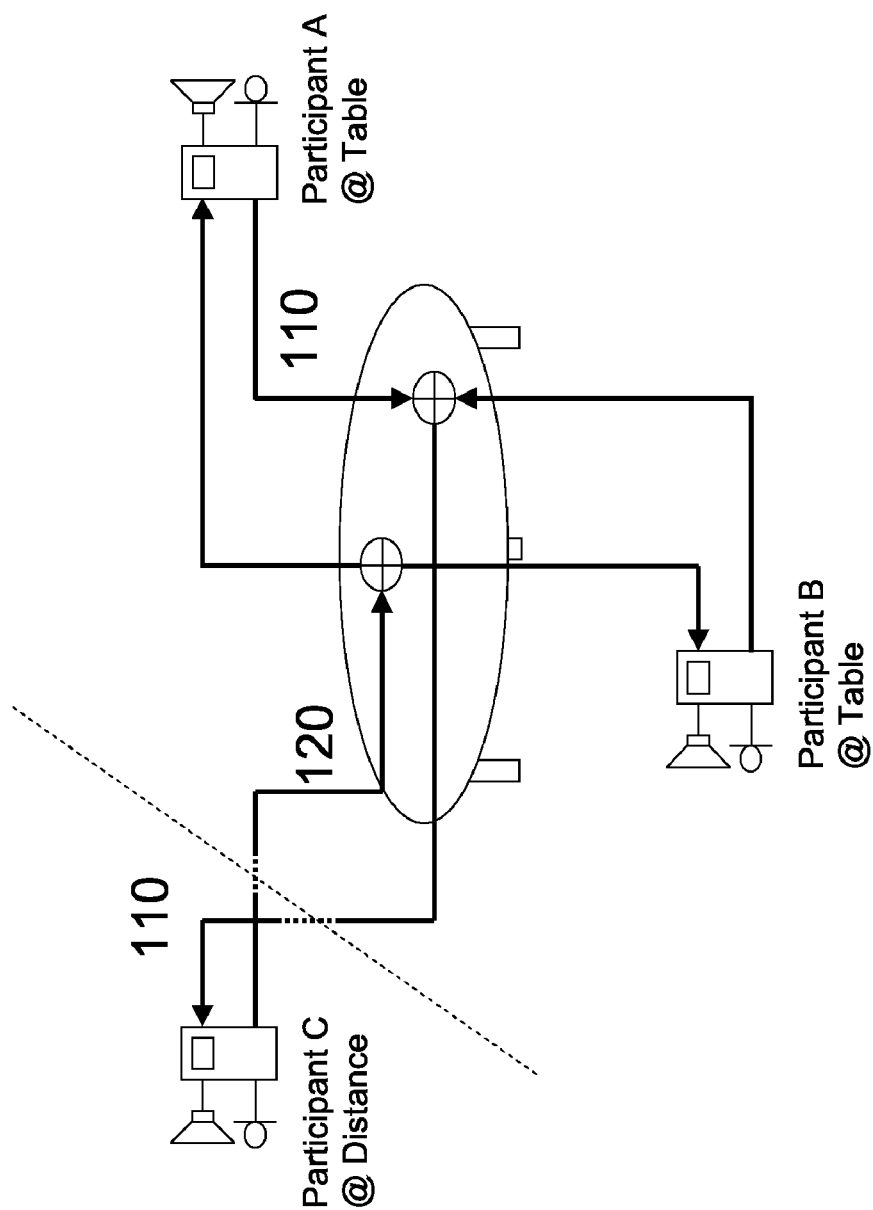
FIG. 1 illustrates an example of voice streams from a conversation between Participant A, B and C in a virtual meeting.
Figure 2:
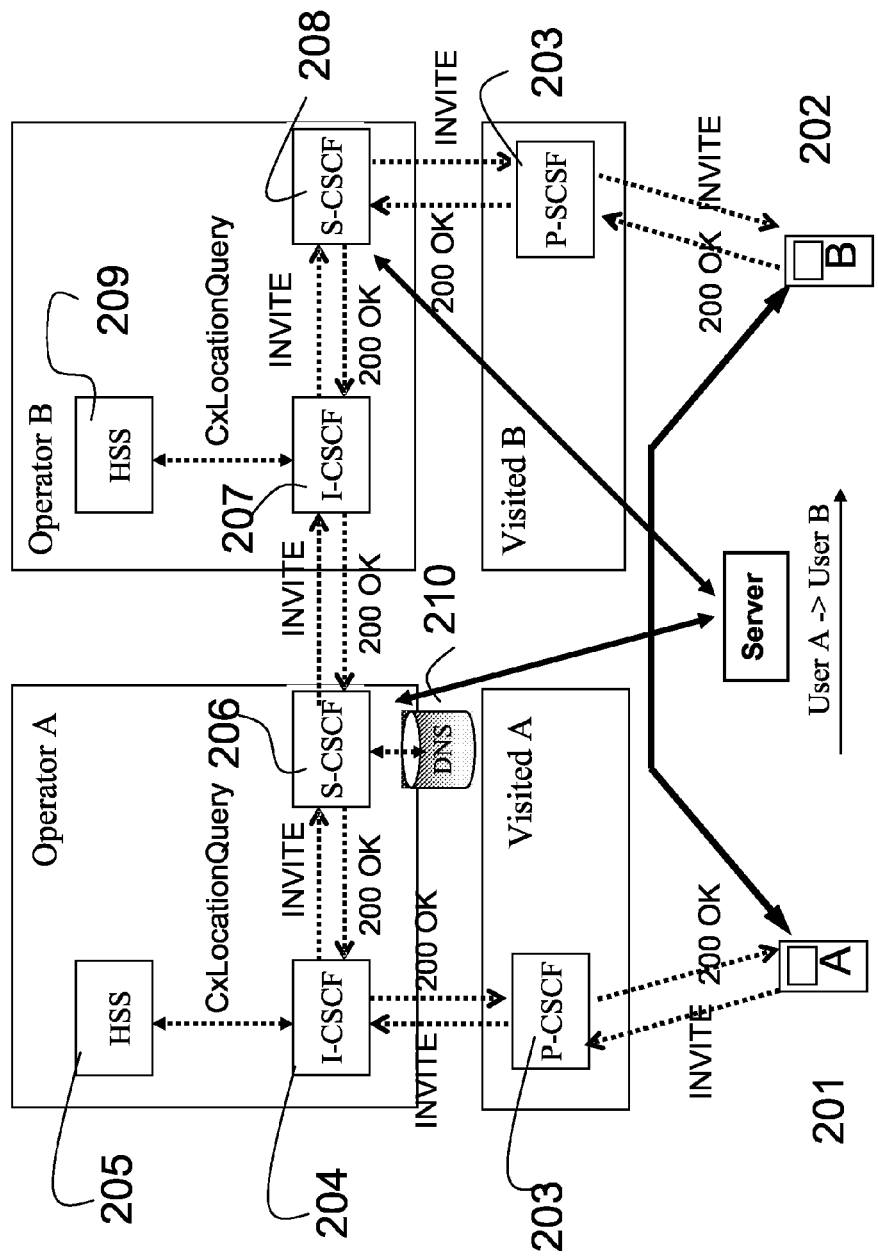
FIG. 2 illustrates an example of the scenario when the server connects to the cellular network in an IMS network.
Figure 3:
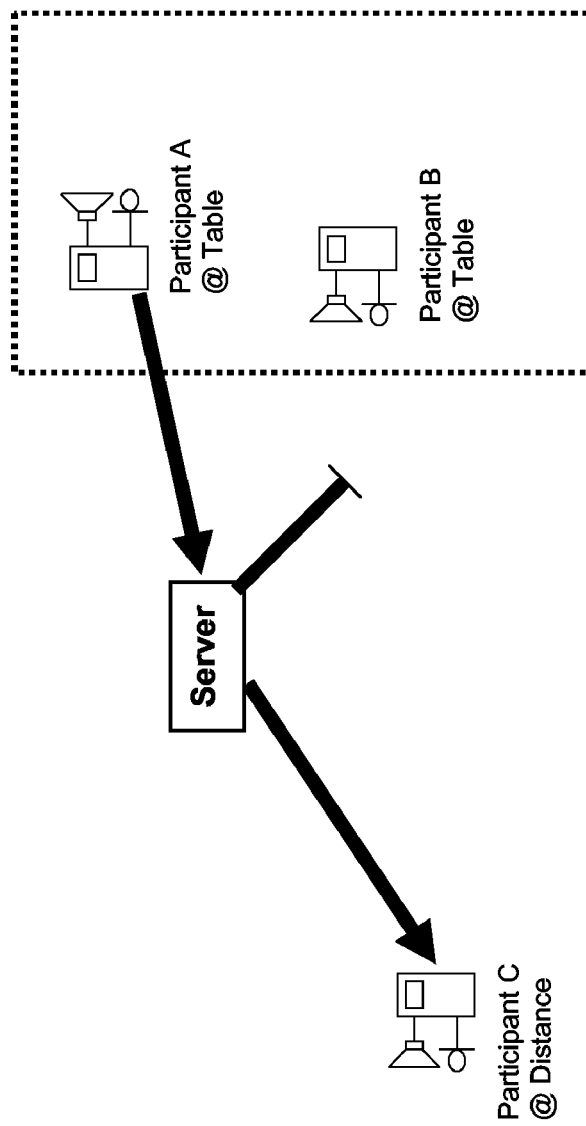
FIG. 3 illustrates the arrangement according to the present invention.
Figure 4:
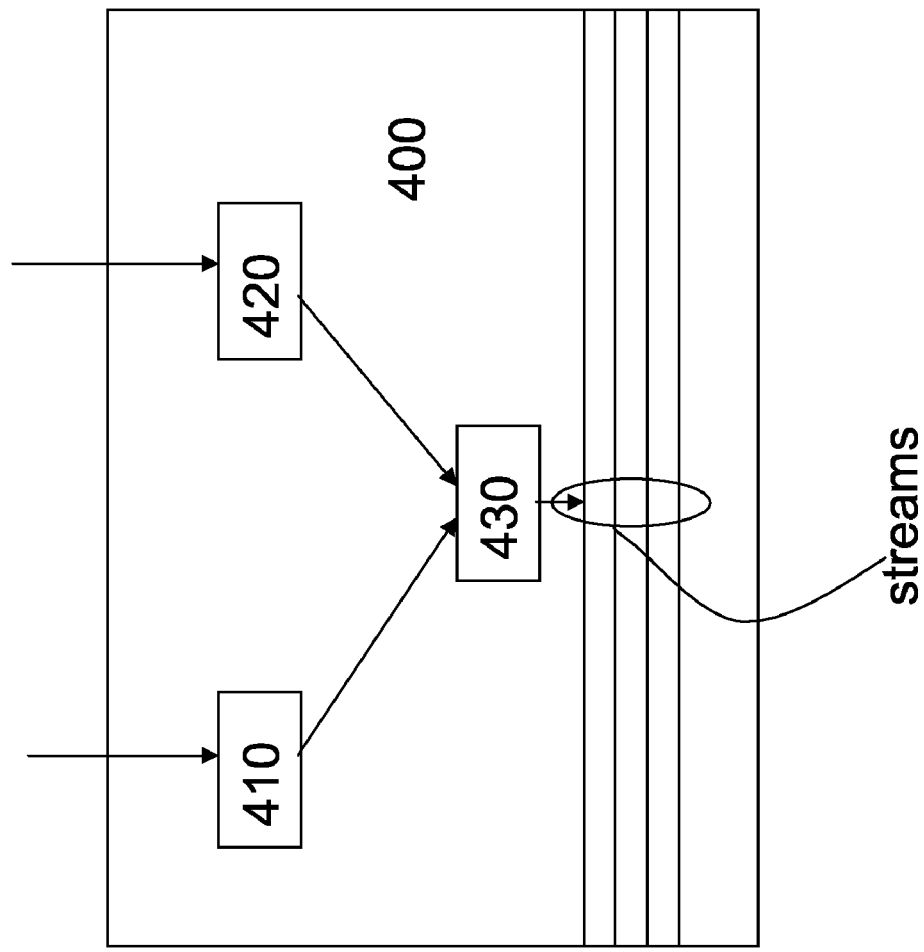
FIG. 4 is a block diagram depicting an arrangement for controlling streams of participants of a virtual meeting in accordance with an embodiment of the present invention.

FIG. 2 illustrates the whispering feature provided by an embodiment of the invention in an IMS (IP Multimedia Subsystem) network. A virtual meeting is set up for three participants, A, B and C. It should be noted that participant C is not shown. A 201 is a subscriber to the operator A and B 202 is a subscriber of Operator B. A SIP session is established between A and B via P-CSCF (Proxy Call/Session Control Function) 203, I-CSCF (Interrogating CSCF) 204 and S-CSCF (Serving CSCF) 206 of operator A and I-CSCF 207, S-CSCF 208 and P-CSCF 203 of operator B. The S-CSCF connects to a DNS (Domain Name Server) in order to find the Ip address of participant B based on the SIP URI of B. The HSS (Home Subscriber Server) 205, 209 is the central repository for user-related information. The Server according to the present invention is adapted to control the functionality of the S-CSCF associated with how the streams are forwarded.

Participant A 201 initiates a whispering session with participant B. 202, which implies that Participant A sends a stream to Participant B via the server. The stream contains the content of his speech as well as the sender- and receiver addresses (e.g. SIP URI, Session Initiation Protocol Unified Resource Identifier). The Server checks the sender- and receiver addresses in order to look-up their specific context and location (which the server stores from the login process or the latest update during the meeting). The server is adapted to block the stream to C since the SIP URI of C is not included in the receiver address field.

An example of SIP URI and location of the users is shown below.
Participant A (URI: sip:participantA@domain.net): conference room
Participant B (URI: sip:participantB@domain.net): at distance 1
Participant C (URI: sip:participantC@domain.net): at distance 2

As stated above, the stream from Participant A is forwarded to Participant B, but not to Participant C. This type of control is possible as the server has knowledge about the sender's and receivers' respective identity and the location for each identity is stored in the server.

Figure 5:
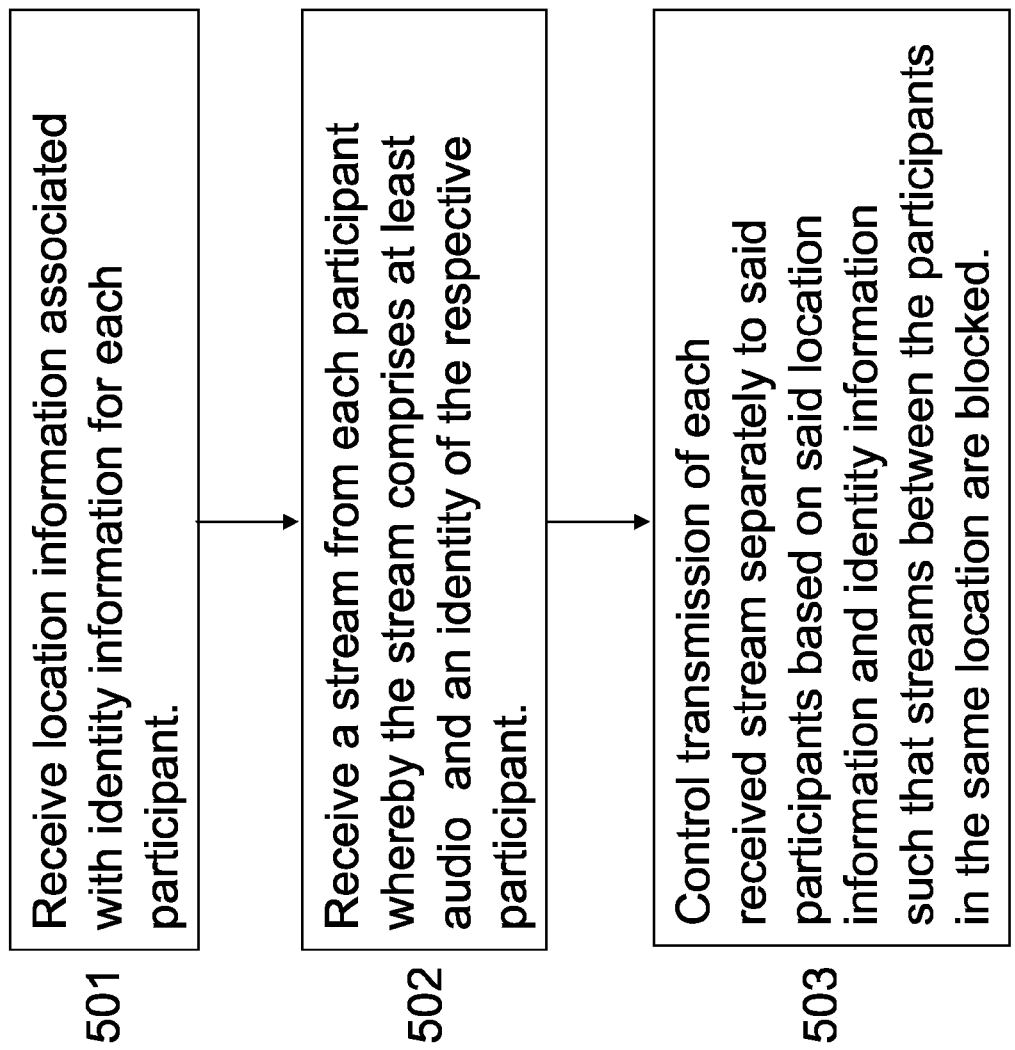
FIG. 5 is a flowchart illustrating a method for controlling streams of participants of a virtual meeting in accordance with an embodiment of the present invention.

As stated above, the present invention relates to an arrangement for controlling streams of participants of a virtual meeting. The arrangement may be implemented in a server or in one or more mobile phones constituting peers in a peer-to peer solution. At least a first participant and a second participant of the virtual meeting are located in a first location and at least a third participant of the virtual meeting is located in a second location. The method is illustrated in a flowchart of FIG. 5 and comprises the steps of:

501. Receive location information associated with identity information for each participant.
502. Receive a stream from each participant whereby the stream comprises at least audio and an identity of the respective participant.
503. Control transmission of each received stream separately to said participants based on said location information and identity information such that streams between the participants in the same location are blocked.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. An arrangement for controlling streams of participants of a virtual meeting, wherein at least a first participant and a second participant are located in a first location and at least a third participant is located in a second location, comprising means for receiving location information associated with identity information for each participant, means for receiving a stream from each participant whereby the stream comprises at least audio and an identity of the respective participant, means for controlling transmission of each received stream separately to said participants based on said location information and identity information such that streams between the participants in the same location are blocked.

2. The arrangement according to claim 1, wherein the location information, of each participant is received at a login procedure.

3. The arrangement according to claim 1, wherein the location information of each participant is received periodically.

4. The arrangement according to claim 1, wherein the means for receiving location information of each participant comprises means for retrieving the location information, wherein the retrieving is triggered by a predetermined event.

5. The arrangement according to claim 1, wherein the identity information is a Session Initiation Protocol (SIP) address.

6. The arrangement according to claim 1, wherein the means for controlling comprises further means for directing a first stream from one participant in the first location to a set of participants in another location wherein the first stream is blocked to participants not being in said first location.

7. The arrangement according to claim 1, comprising means for logging the activity of the participants based, on the identity information and means for presenting the logged activity to the participants of the virtual meeting.

8. The arrangement according to claim 1, comprising means for adding at least two streams into one stream.

9. The arrangement according to claim 1, comprising means for voice activity detection, VAD, and means for only sending streams wherein voice is detected.

10. The arrangement according to claim 9, comprising means for decoding and coding based on the VAD.

11. The arrangement according to claim 9, comprising means for switching output between coded incoming streams based on the VAD and means for performing decoding only when voice is detected.

12. The arrangement according to claim 1, wherein the arrangement constitutes a server and the participants constitutes clients in a client server solution.

13. The arrangement according to claim 1, wherein the arrangement is located in a mobile phone of a participant of the virtual meeting and constituting a moderator peer and the mobile phones of the participants of the virtual meeting constituting peers in a peer-to-peer solution.

14. A method for controlling streams of participants of a virtual meeting, wherein at least a first participant and a second participant are located in a first location and at least a third participant is located in a second location, comprising the steps of:

receiving location information associated with identity information for each participant, receiving a stream from each participant whereby the stream comprises at least audio and an identity of the respective participant, and controlling transmission of each received stream separately to said participants based on said location information and identity information such that streams between the participants in the same location are blocked.

15. The method according to claim 14, wherein the location information of each participant is received at a login procedure.

16. The method according to claim 14, wherein the location information of each participant is received periodically.

17. The method according to claim 14, wherein the step of receiving location information of each participant comprises the step of retrieving the location information, wherein the retrieving is triggered by a predetermined event.

18. The method according to claim 14, wherein the identity information is a Session Initiation Protocol (SIP) address, IMSI or an IP address.

19. The method according to claim 14, wherein the step of controlling comprises the further step of directing a first stream from one participant in the first location to a set of participants in another location wherein the first stream is blocked to participants not being in said first location.

20. The method according to claim 14, comprising the step of logging the activity of the participants based on the identity information and presenting the logged activity to the participants of the virtual meeting.

21. The method according to claim 14, comprising the step of adding at least two streams into one stream.

22. The method according to claim 14, comprising the step of voice activity detection, VAD, and only sending streams wherein voice is detected.

23. The method according to claim 22, comprising the step of decoding and coding based on the VAD.

24. The method according to claim 22, comprising the step of switching output between coded incoming streams based on the VAD and performing decoding only when voice is detected.

25. The method according to claim 14, wherein the method is implemented in a server and the participants employ clients in a client server solution.

26. The method according to claim 14, wherein the method is implemented in a mobile phone of a participant of the virtual meeting and the mobile phones of the participants of the virtual meeting are peers in a peer-to-peer solution.

* * * * *